(12) United States Patent
Park et al.

(10) Patent No.: US 7,465,496 B2
(45) Date of Patent: Dec. 16, 2008

(54) POWDER FOR ISOLATING INFRARED RAYS, AND ISOLATING SOLUTION AND GOODS USING THE SAME

(75) Inventors: Jang-Woo Park, Daejeon (KR); Sung-Ryul Kim, Seoul (KR); Su-Mi Choi, Daejeon (KR)

(73) Assignees: Advanced Nano Products Company Limited (KR); Toray Saehan Incorporated (KR)

( * ) Notice: Subject to any disclaimer, the term of this patent is extended or adjusted under 35 U.S.C. 154(b) by 579 days.

(21) Appl. No.: 10/552,461

(22) PCT Filed: Apr. 3, 2004

(86) PCT No.: PCT/KR2004/000791

§ 371 (c)(1),
(2), (4) Date: Oct. 7, 2005

(87) PCT Pub. No.: WO2004/090049

PCT Pub. Date: Oct. 21, 2004

(65) Prior Publication Data

US 2006/0226403 A1    Oct. 12, 2006

(30) Foreign Application Priority Data

Apr. 7, 2003    (KR) .................. 10-2003-0021570

(51) Int. Cl.
    $B32B\ 5/66$    (2006.01)
(52) U.S. Cl. .................. 428/403; 428/404; 428/405; 428/406; 428/407
(58) Field of Classification Search ............. 428/403, 428/404, 405, 406, 407
    See application file for complete search history.

(56) References Cited

U.S. PATENT DOCUMENTS 5,691,838 A * 11/1997 Shouji et al. ............ 359/359

FOREIGN PATENT DOCUMENTS

| | | | |
|---|---|---|---|
| JP | 7-70363 | | 3/1995 |
| JP | 8-67837 | | 3/1996 |
| JP | 10-101375 | * | 4/1998 |
| KR | 1999-64113 | | 7/1999 |
| WO | 97/15935 | | 5/1997 |

* cited by examiner

*Primary Examiner*—Leszek Kiliman
(74) *Attorney, Agent, or Firm*—Wenderoth, Lind & Ponack, L.L.P.

(57) ABSTRACT

Disclosed is a novel concept of infrared blocking powder, that is to say, indium antimony tin oxide (IATO), which is produced by mixing indium (In), antimony (Sb), and tin (Sn) in a predetermined mixing ratio, and co-precipitating a mixture in solvent. Additionally, the present invention provides infrared blocking solution and infrared blocking material using the infrared blocking powder, which allow visible rays to transmit therethrough but effectively block near-infrared rays acting as thermic rays.

14 Claims, 2 Drawing Sheets

POWDER FOR ISOLATING INFRARED RAYS, AND ISOLATING SOLUTION AND GOODS USING THE SAME

TECHNICAL FIELD

The present invention relates to a novel concept of infrared blocking powder, that is to say, indium antimony tin oxide (hereinafter, referred to as "IATO"), which is produced by mixing indium (In), antimony (Sb), and tin (Sn) in a predetermined mixing ratio, and co-precipitating a mixture in a solvent. Additionally, the present invention provides infrared blocking solution and infrared blocking material using the infrared blocking powder, which allow visible rays to transmit therethrough but effectively block near-infrared rays acting as thermic rays.

BACKGROUND ART

Of the various rays of the sun, having different wavelengths, an ultraviolet ray with a wavelength of 150 to 380 nm functions to discolor a substance or to damage a skin, and an infrared ray with the wavelength of 780 to 2300 nm has heat energy corresponding to 53% of solar energy. Accordingly, there is a need to develop functional coating material (blocking material) capable of allowing a visible ray with the wavelength of 380 to 780 nm to easily transmit therethrough and effectively blocking the ultraviolet and infrared rays.

A conventional sunlight blocking film for automobiles is disadvantageous in that it cannot be applied to the front windows of automobiles, through which heat is mostly transmitted, because of its poor transparency even though it can block the ultraviolet ray. Additionally, the conventional sunlight blocking film cannot effectively block heat outside the automobiles, and thus, air conditioners of the automobiles are excessively used to cool insides of the automobiles in summer, leading to enormous energy consumption and serious pollution. In winter, indoor heat is mostly lost through windows, which brings about energy waste. To avoid heat dissipation, a transparent heat blocking film may be attached to the windows.

In order to better understand the background art of the present invention, a description will be given of a conventional transparent coated film capable of allowing the visible ray to easily transmit therethrough and blocking the infrared ray. Technologies regarding the conventional transparent coated film may be classified into a) a gas phase process, in which an indium tin oxide (hereinafter, referred to as "ITO") film is formed according to physical and chemical deposition processes or a sputtering process, and b) another process using anthraquinone-, naphthalocyanine-, cyanine-, phthalocyanine-, metal complex-, diammonium-, azo compound-, copper compound-, polymethine-, triphenylmethane-, and quinone-based pigments.

In detail, in the case of the gas phase process (a), it is necessary to use a high-priced sputtering device requiring high vacuum and high precision, and thus, the gas phase process is disadvantageous in terms of the production costs and productivity. Furthermore, the process of b) is disadvantageous in that sufficient infrared blocking effect is not ensured at a relatively wide wavelength range but only the infrared ray with a specific wavelength is blocked, a surface of the coated film is discolored due to UV, heat, moisture and the like, and an infrared blocking ability is not constantly secured.

To avoid the above disadvantages, there has been developed a composition for a near-infrared blocking filter, which is mass-produced at relatively low cost, and which includes ITO ultrafine powder or antimony tin oxide (hereinafter, referred to as "ATO") ultrafine powder, metal oxides, and organic and inorganic dyes and pigments (JP-A-7-24957, JP-A-7-70363, JP-A-70482, and JP-A-7-445).

However, the composition including the ITO and ATO ultrafine powders is disadvantageous in that the transmissivity is relatively low within a near-infrared range with the wavelength of 1400 nm or more, but the transmissivity is relatively high within the near-infrared range with the wavelength of 701 to 1399 nm, and thus, it is difficult to secure a desirable infrared blocking effect.

Furthermore, in case that a metal oxide and a metal form a multilayered structure according to the sputtering process, even though an infrared blocking effect is improved, the productivity is poor, the production costs are relatively high, and the multilayered structure reflects sunlight, bringing about a dazzling phenomenon. In addition, the multilayered structure leads to a wave phenomenon in night, thereby hindering any view. As well, it is easily corroded in a zone, at which air contains a great amount of salt.

Recently, many studies have been made to develop a process using near-infrared absorbing dyes and pigments. However, this process has disadvantages in that sufficient infrared blocking effect is not ensured at the relatively wide wavelength range but only the infrared ray with the specific wavelength is blocked, the surface of the coated film is discolored due to UV, heat, moisture and the like, and the infrared blocking ability is not constantly secured.

Additionally, a glass filter, on which a metal film is deposited, and a phosphate glass filter, containing metal ions, are well known to those skilled in the art. However, these glass filters are insufficiently competitive in terms of production costs.

Generally, a process of producing the ITO powder includes reacting an aqueous solution, containing indium (In) and a small amount of tin (Sn), with alkali to co-precipitate indium and tin hydroxides, and heating and sintering the indium and tin hydroxides under atmospheric air to produce oxide compounds. However, the ITO powder thusly produced has a disadvantage in that it does not efficiently block the infrared ray even though the ITO powder has excellent transparency within a visible ray wavelength range, because excellent infrared blocking efficiency of the ITO powder is ensured at the wavelength range of 1000 nm or more.

Furthermore, it is widely known that a color of the ITO powder is yellow when it is oxidized, and is blue when it is partially reduced. Accordingly, when the ITO powder, including particles with a particle size of 100 nm or less, is dissolved in a coating liquid and then coated on a base, the coated surface is not transparent but has an opaque white color. Hence, it is difficult to apply the ITO powder to the transparent base.

Therefore, there remains a need to develop the ITO powder having an excellent infrared blocking effect. With respect to this, a conventional method of producing an infrared blocking ITO powder is disclosed in Korean Pat. Publication No. 01-0214428, in which a co-precipitate of indium and tin is sintered under a pressurized inert gas.

However, the above conventional method is disadvantageous in that production costs are relatively high, explosion easily occurs, and productivity is poor because the ITO powder is produced at a relatively high pressure of 5 to 60 kgf/$cm^2$.

Other disadvantages of the conventional method are that when only the partially reduced ITO powder is used, a chromaticity coordinate haze problem occurs and the ITO powder is easily oxidized under atmospheric air.

In the case of using only ATO, when the infrared blocking ability is improved, the powder has very low transparency within the visible ray wavelength range, and thus, it is practically difficult to commercialize the powder.

Further, in the case of using a powder mixture, containing ITO and ATO powders mechanically mixed with each other, when a sufficiently many amount of ATO powder is used to compensate for problems caused by the ITO powder, the infrared blocking ability is reduced and the transmissivity is reduced at the visible ray wavelength range. On the other hand, when a small amount of ATO powder is mixed with the ITO powder, it is impossible to overcome the problems, such as the chromaticity coordinate haze problem and the oxidation of the ITO powder under atmospheric air, occurring in use of the ITO powder.

DISCLOSURE

Technical Problem

Accordingly, the present invention has been made keeping in mind the above problems occurring in the prior art, and an object of the present invention is to provide infrared blocking powder, which has the relatively high transmissivity within a visible ray wavelength range and effectively blocks infrared rays, and which has excellent color textile and secures a stable infrared blocking effect. In addition, the present invention provides infrared blocking solution using the infrared blocking powder, and infrared blocking material using the infrared blocking solution.

Another object of the present invention is to provide infrared blocking powder, which can be mass-produced at relatively low costs, infrared blocking solution using the infrared blocking powder, and infrared blocking material using the infrared blocking solution.

Technical Solution

Leading to the present invention, the intensive and various researches into improvement of the infrared blocking powder, carried out by the present inventors aiming to solve the problems encountered in the prior arts, resulted in the finding that it is difficult to effectively block near-infrared rays using conventional ITO and ATO powders. Accordingly, the present inventors adopted a novel method of producing the ITO powder, having excellent infrared blocking ability, in order to avoid conventional problems caused by metal oxides.

In other words, the present inventors accomplished the infrared blocking powder, having the excellent infrared blocking ability, according to a novel method, instead of a typical ITO powder production method as known to those skilled in the art.

Based on the present invention, the above objects can be accomplished by providing the infrared blocking powder, which is IATO powder. In this regard, antimony is used to avoid a haze problem when the powder is applied to a base, to be coated, and to control a color of the powder, and tin and indium is used to improve the infrared blocking ability. Additionally, indium, antimony, and tin are co-precipitated while being mixed with each other in a predetermined mixing ratio to produce the IATO powder without mechanically mixing ITO powder and ATO powder with each other. Accordingly, the IATO powder has better performance and stability than the ITO and ATO powders.

In order to accomplish the above objects, the present invention provides a novel infrared blocking powder. In this regard, an infrared blocking powder can be produced by forming a mixture of an indium salt, an antimony salt and a tin salt in a mixing ratio of 15 to 90 wt %:1 to 20 wt %:5 to 80 wt %, dissolving the mixture in water, adding a growth inhibitor and a basic solution into the water having the dissolved mixture to precipitate powder, rinsing the powder, drying the rinsed powder, and sintering the dried powder.

At this time, the indium salt, the antimony salt and the tin salt may desirably be indium nitrate $(In(NO_3)_3)$, antimony chloride $(SbCl_3)$ and tin chloride $(SnCl_2)$, respectively.

In addition, it is preferable that the sintering of the dried powder is conducted at 400 to 1000° C. under an oxygen-free hydrogen atmosphere.

Further, the present invention provides an infrared blocking solution, which includes the infrared blocking powder dispersed in a solvent. At this time, the solvent can be selected from the group consisting of alcohol, water, organic solvent, and a mixture thereof.

In this respect, it is preferable that the infrared blocking powder has a particle size of 5 to 200 nm.

Furthermore, the present invention provides infrared blocking solution, which includes the infrared blocking powder, solvent, conductive polymer, organic dispersion agent, and photoinitiator.

At this time, it is preferable that the infrared blocking powder has a particle size of 5 to 200 nm.

As well, a content of the infrared blocking powder is preferably 5 to 70 wt % in the infrared blocking solution.

Moreover, the present invention provides infrared blocking material, which is produced by coating the infrared blocking solution on a surface of a base.

With respect to this, it is preferable that an adhesive layer be formed on any one side of the infrared blocking material coated on the base.

Advantageous Effect

According to the present invention, aqueous compounds of indium, antimony, and tin are co-precipitated to produce a novel concept of infrared blocking powder, that is, indium antimony tin oxide (IATO) powder, and infrared blocking solution and infrared blocking material are produced using the IATO powder. Therefore, the IATO powder of the present invention has the relatively high transmissivity within a visible ray wavelength range and effectively blocks infrared rays, and which has excellent color textile and secures a stable infrared blocking effect.

BRIEF DESCRIPTION OF DRAWINGS

The above and other objects, features and other advantages of the present invention will be more clearly understood from the following detailed description taken in conjunction with the accompanying drawings, in which.

MODE FOR INVENTION

Figure 1:
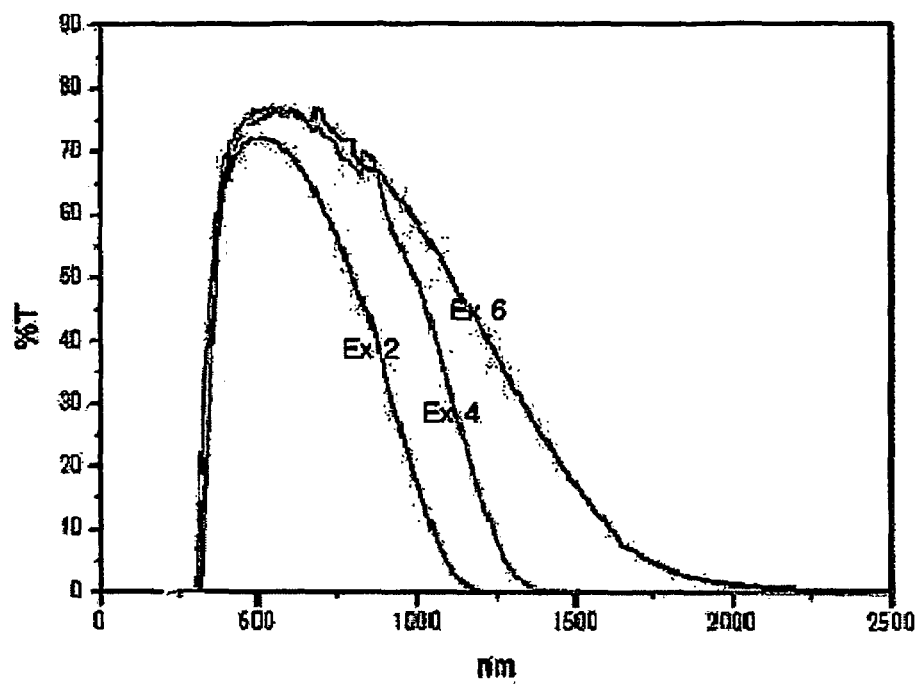
FIG. 1 illustrates light transmission spectrum curves according to examples 2, 4, and 6 of the present invention.
Figure 2:
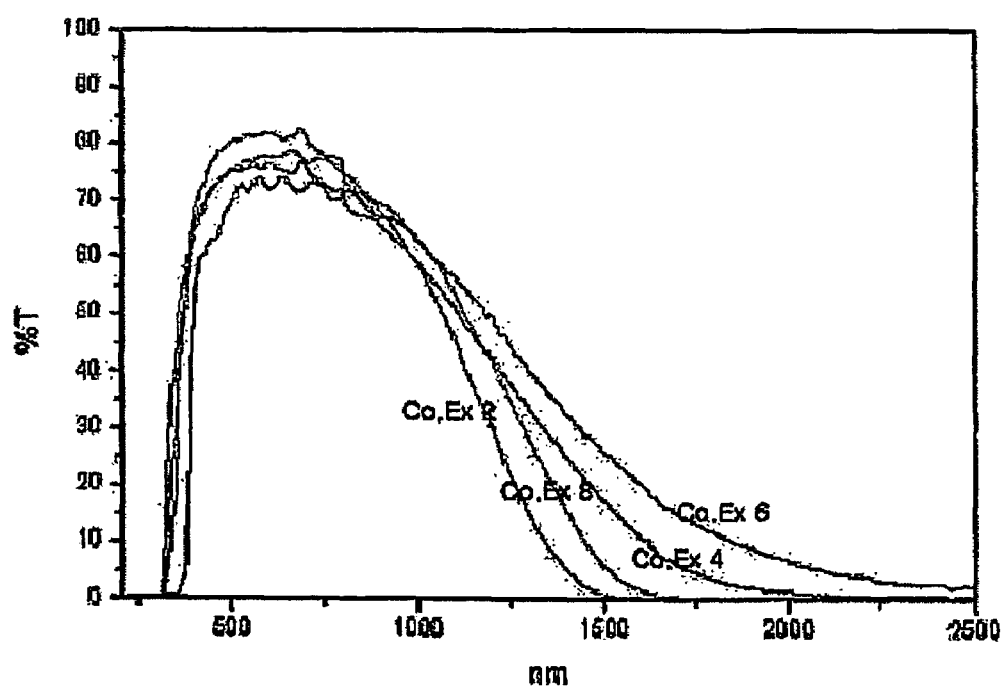
FIG. 2 illustrates light transmission spectrum curves according to comparative examples 2, 4, 6, and 8 of the present invention.
Figure 3:
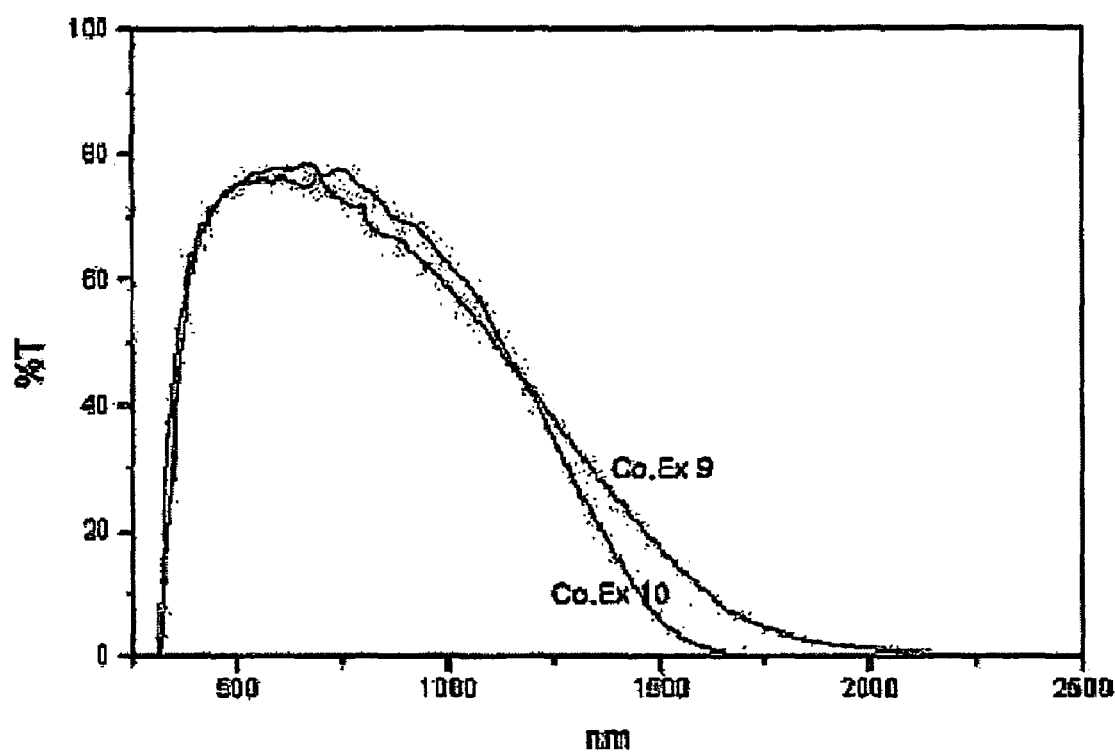
FIG. 3 illustrates light transmission spectrum curves according to comparative examples 9 and 10 of the present invention.

Having generally described this invention, a further understanding can be obtained by reference to examples and comparative examples which are provided herein for the purposes of illustration only and are not intended to be limiting unless otherwise specified.

Infrared blocking indices, visible ray transmissivities, and physical properties of samples according to examples of the present invention are evaluated as follows.

Light transmission spectra of infrared blocking powder and a coated film, acting as infrared blocking material, are measured within a wavelength range of 2500 nm using UV-3100PC manufactured by Shimadzu Corp., chromaticities and color purities of the powder and coated film are measured using DARSA-5000 system manufactured by PSI TECH Inc., and hazes of the powder and coated film are measured using a Hazemeter. Additionally, the strength of the coated film is measured using a hardness measuring device for a pencil manufactured by Optical Precision Corp.

In producing IATO powder, a mixing ratio of indium, antimony, and tin is 90:5:5 (A), 45:5:50 (B), and 15:5:80 (C) based on 100 parts by weight of the IATO powder. At this time, the mixing ratio is for the purpose of describing particular embodiments only and is not intended to be limiting.

During the production of infrared blocking solution, when a particle size of the infrared blocking powder is more than 200 nm, the transparency of the infrared blocking solution is reduced and the haze is undesirably increased within a visible ray wavelength range. Accordingly, the particle size of the powder is set to 100 nm or less in examples of the present invention.

Furthermore, when the particle size of the powder is more than 200 nm, the transmissivity of the visible ray through the infrared blocking solution is less than 40%, and the haze of the infrared blocking solution is relatively high, and thus, it is practically impossible to commercialize the infrared blocking powder. On the other hand, when the particle size of the powder is less than 5 nm, the production of the powder is not easily conducted, and thus, the productivity is reduced.

In examples and comparative examples, the strengths of coated films are 2 H or more, and the hazes are less than 2.

[Production of the Infrared Blocking Powder]

According to the present invention, indium, antimony, and tin are mixed with each other in various mixing ratios in accordance with the use of each infrared blocking powder to produce infrared blocking powders.

Aqueous compounds of metals, used in a co-precipitation process of producing the infrared blocking powders, are exemplified by nitrides, chlorides, acetates, and sulfides. In addition, examples of a basic aqueous solution, used in the hydrolysis, include hydroxides of alkaline metals, amines, and ammoniums. Further, the excessive growth of particles during a reaction of indium, antimony, and tin is effectively controlled using materials, chelated on surfaces of particles constituting the powder, such as sodium acetyl acetonate and polyacrylic acid (manufactured by Aldrich Chemical Co. and having a molecular weight of 2000).

In other words, aqueous compounds of indium, antimony, and tin are mixed with each other in a predetermined mixing ratio, and then dissolved in water. A growth inhibitor and the basic aqueous solution are added into the mixed solution to co-precipitate powder, the co-precipitate powder containing moisture is rinsed and then dried. The dried co-precipitate powder is sintered under an oxygen-free hydrogen atmosphere, thereby accomplishing the infrared blocking powder.

As described above, the present invention provides a novel concept of indium antimony tin oxide (IATO) powder, the infrared blocking powder, produced by co-precipitating the aqueous compounds of indium (In), antimony (Sb), and tin (Sn) so that indium is doped with antimony and tin.

A better understanding of the IATO powder according to the present invention may be obtained through the following example 1 which is set forth to illustrate, but is not to be construed as the limit of the present invention.

In the examples of the present invention, ultrafine powder, having the particle size of 10 to 50 nm, is used as the infrared blocking powder (IATO), a mixture of 25.2 parts by weight of methyl ethyl ketone (MEK) and 10.8 parts by weight of toluene is used as a dispersion media, 20 parts by weight of acrylate oligomer (EB-9970 manufactured by SK UCB Corp.) is used as a resin, acetate-based disperbyk-170, manufactured by BYK-Chemie Inc., is used as a dispersion agent, and hydroyketone-based Irgacure 184, manufactured by Ciba Specialty Chemicals Inc., is used as a photoinitiator.

EXAMPLE 1

Indium salts, antimony salts, and tin salts were mixed with each other in a mixing ratio of 15 to 90 wt %:1 to 20 wt %:5 to 80 wt %, and dissolved in water. Preferably, indium nitrate ($In(NO_3)_3$), antimony chloride ($SbCl_3$) and tin chloride ($SnCl_2$) were mixed with each other in the mixing ratio of 90:5:5 (weight ratio), and dissolved in water. After the completion of the dissolution of the indium salts, the antimony salts and the tin salts in water, sodium acetylacetonate, acting as a growth inhibitor, and a caustic soda aqueous solution, acting as a basic solution, were added in a predetermined equivalence ratio into the mixed solution to form a powder co-precipitate.

The co-precipitate, containing moisture, was rinsed with distilled water, dried, and sintered at 400 to 1000° C. under an oxygen-free hydrogen atmosphere to produce reduced IATO powder (A), thereby accomplishing infrared blocking powder according to the present invention.

In this respect, it is preferable that a sintering temperature be 400 to 800° C. When the sintering temperature is higher than 1000° C., the growth of particles, constituting the infrared blocking powder, is significantly increased, preventing the uniform dispersion of the particles in a paste, produced using the infrared blocking powder and coated on a base, to reduce the transparency of paste.

Furthermore, the present invention provides infrared blocking solution, which is produced by dispersing the infrared blocking powder in an organic or inorganic resin (matrix), and which is coated on the base according to a predetermined coating process.

At this time, the infrared blocking solution according to the present invention is produced by dispersing the infrared blocking powder in solvent, selected from the group consisting of alcohol, water, organic solvent, and a mixture thereof.

A detailed description will be given of the production of the infrared blocking solution, below.

[Production of the Infrared Blocking Solution]

IATO powders, produced by mixing indium, antimony, and tin with each other in various mixing ratios, are mixed with solvent and conductive polymer to produce infrared and ultraviolet blocking coating solution.

The IATO content in the solution is 5 to 70 wt %, and the content of the solvent, containing the conductive polymer, in the solution is 30 to 95 wt %. Additionally, dispersion liquid, containing 1 to 10 wt % of organic dispersion agent, acting as an adhesion and storage stability promoter, and 0.1 to 10 wt % of photoinitiator, is added into the infrared and ultraviolet blocking coating solution.

The infrared and ultraviolet blocking coating solution according to the present invention is advantageous in that the transparency is excellent within a visible ray wavelength range, infrared and ultraviolet rays are effectively blocked, and the solution ensures excellent storage stability, strength of a coated film, and coating ability.

Any one of water, alcohol, and organic solvent may be applied as the solvent to the infrared blocking solution as long as the solvent has no negative affect the environment.

Illustrative, but non-limiting examples of the organic solvent may include alcohols, such as methanol, ethanol, isopropanol, butanol, ethyl cellosolve, methyl cellosolve, and diacetonealcohol, ketones, such as methyl ethyl ketone, isobutyl ketone, and methyl isobutyl ketone, and benzenes, such as benzene, toluene, and xylene.

In this regard, one kind of organic solvent may be used, or a combination of different organic solvents with different boiling points may be used to maintain uniformity of the coated film.

The organic or inorganic resin may be exemplified by a photo-polymerizable prepolymer or a photo-polymerizable monomer.

The photo-polymerizable prepolymer may be classified into a radical-polymerization type of prepolymer and a cation-polymerization type of prepolymer. In this regard, examples of the radical-polymerization type of prepolymer include polyester acrylates, epoxy acrylates, urethane acrylates, and polyol acrylates.

At this time, one kind of photo-polymerizable prepolymer, or a combination of two or more kinds of photo-polymerizable prepolymers may be used to produce the infrared blocking solution.

Typically, an epoxy-based resin is used as the cation-polymerization type of prepolymer. Furthermore, examples of the photo-polymerizable monomer include multifunctional acrylate, such as 1,4-butandiol di(metha)acrylate, 1,6-hexanediol di(metha)acrylate, neopentyl glycol di(metha)acrylate, polyethylene glycol di(metha)acrylate, neopentyl glycol adipate di(metha)acrylate, hydroxypivalate neopentyl glycol di(metha)acrylate, dicyclopentanyl di(metha)acrylate, caprolactone deformed dicyclopentenyl di(metha)acrylate, ethylene oxide deformed phosphate di(metha)acrylate, alkylated cyclohexyl di(metha)acrylate, isocyanurate di(metha)acrylate, trimethylol propane tri(metha)acrylate, dipentaerithritol tri(metha)acrylate, propionate deformed dipentaerithritol (metha)acrylate, tris(acryloxyethyl) isocyanurate, and propionate deformed dipentaerithritol pantri(metha)acrylate.

One kind of photo-polymerizable monomer, or a combination of two or more kinds of photo-polymerizable monomers may be used to produce the infrared blocking solution. Additionally, the photo-polymerizable monomer may be used in conjunction with the photo-polymerizable prepolymer.

Examples of the photoinitiator for the radical-polymerization type of prepolymer or the photo-polymerizable monomer include benzoin, benzoin methyl ether, benzoin ethyl ether, benzoin isopropyl ether, benzoin-n-butyl ether, benzoin isobutyl ether, acetophenone, dimethyl aminoacetophenone, 2,2-dimethoxy-2-phenylacetophenone, 2-methyl-1[4-(methylthio)phenyl]-2 morpholino-propane-1-on, 4-(2-hydroxyethoxy)phenyl-2(hydroxy-2-propyl)ketone, benzophenone, P-phenylbenzophenone, dichlorobenzophenone, 2-methylanthraquinone, acetophenone dimethylketal, and P-dimethylamine benzoic acid ester. Further, the photoinitiator for the cation-polymerization type of prepolymer is exemplified by compounds including oniums, such as aromatic sulfonium ions, aromatic oxosulfonium ions, and aromatic iodnium ions, and anions, such as tetrafluoroborate, hexafluorophosphate, hexafluoroantimonate, and hexafluoroarsenat.

At this time, one kind of photoinitiator, or a combination of two or more kinds of photoinitiators may be used to produce the infrared blocking solution. As well, an amount of the photoinitiator in the infrared blocking solution is 0.2 to 10 parts by weight based on 100 parts by weight of the photo-polymerizable prepolymer and photo-polymerizable monomer.

The infrared blocking solution according to the present invention will be exemplified by the following example 2.

EXAMPLE 2

40 parts by weight of infrared blocking IATO powder, produced according to example 1, was added into solvent containing 25.2 parts by weight of methyl ethyl ketone and 10.8 parts by weight of toluene mixed with each other. 20 parts by weight of acrylate oligomer (EB-9970 manufactured by SK UCB Corp.) was added into the resulting solvent, and 3 parts by weight of dispersion agent was then added into a mixed solution in an amount of 7 to 8% of the IATO powder. The resulting mixture was dispersed in coating liquid using a ball mill device. When the particle size of the IATO powder was 100 nm, 1 parts by weight of photoinitiator was added into the resulting coating liquid while the resulting coating liquid being sufficiently agitated, thereby accomplishing paste-like infrared blocking solution containing 40% of solids.

Meanwhile, the present invention provides infrared blocking material using the infrared blocking solution.

With respect to this, the IATO powder is dispersed in the organic or inorganic resin (matrix), coated on the base according to a predetermined coating process, dried, and cured to produce the infrared blocking material according to the present invention.

In other words, the infrared blocking solution is coated on the base to form a film, acting as the infrared blocking material, on the base. At this time, the infrared blocking solution may be coated on any one or both sides of the base, and an adhesive layer may be formed on the solution-coated side or another side, on which the infrared blocking solution is not coated, of the base.

Examples of the coating process include a bar coating process, a screen printing process, a reverse coating process, a gravure coating process, a die coating process, a roll coating process, a knife coating process, and a blade coating process. Additionally, the coated film of the infrared blocking solution may be cured by a heat curing process or irradiating UV onto the coated film.

It is preferable that the base be transparent because the infrared blocking material is transparent. Non-limiting, illustrative examples of the base include plastics, glasses, and ceramics.

Hereinafter, examples 3 to 7 and comparative examples 1 to 10 will be described, which are for illustration purposes only and in no way limit the scope of the present invention.

EXAMPLE 3

The infrared blocking solution, produced according to example 2, was coated on a polyethylene terephthalate (PET) film using a bar coater, and dried at 100° C. for 3 min to form a coated layer with a thickness of 3 μm, acting as an infrared blocking material and containing IATO powder.

As described in the following Table 1, the transmissivity of visible rays through the infrared blocking material was 75% or more, and the transmissivity of infrared rays through the infrared blocking material was 20% or less at a wavelength of 1000 nm. Accordingly, it can be seen that the coated layer, acting as the infrared blocking material, had excellent infrared blocking ability.

In a graph showing xy chromaticity of the infrared blocking material, an x value was 0.3043 and a y value was 0.3281. Furthermore, the color purity of the infrared blocking material was 18.2.

EXAMPLE 4

The procedure of example 1 was repeated to produce IATO powder (B) except that indium nitrate ($In(NO_3)_3$), antimony chloride ($SbCl_3$), and tin chloride ($SnCl_2$) were mixed with each other in a mixing ratio of 45:5:50 (B).

EXAMPLE 5

Coating paste was produced using the IATO powder (B) of example 4 according to the same procedure as example 3, and then coated on a base to form a coated layer, acting as an infrared blocking material. As described in the following Table 1, the transmissivity of visible rays through the infrared blocking material was 75% or more, and the transmissivity of infrared rays through the infrared blocking material was 50% or less at a wavelength of 1000 nm. Accordingly, it can be seen that the coated layer, acting as the infrared blocking material, had excellent infrared blocking ability.

In a graph showing xy chromaticity of the infrared blocking material, an x value was 0.3109 and a y value was 0.3319. Furthermore, the color purity of the infrared blocking material was 16.1.

EXAMPLE 6

The procedure of example 1 was repeated to produce reduced IATO ultrafine powder (C) except that indium nitrate ($In(NO_3)_3$), antimony chloride ($SbCl_3$), and tin chloride ($SnCl_2$) were mixed with each other in a mixing ratio of 15:5:80, and polyacrylic acid was used as a growth inhibitor.

EXAMPLE 7

Infrared blocking paste was produced using the reduced IATO powder (C) of example 6 according to the same procedure as example 3, and then coated on a base to form a coated layer, acting as an infrared blocking material. As described in the following Table 1, the transmissivity of visible rays through the infrared blocking material was 75% or more, and the transmissivity of infrared rays through the infrared blocking material was 65% or less at a wavelength of 1000 nm.

In a graph showing xy chromaticity of the infrared blocking material, an x value was 0.3041 and a y value was 0.3278. Furthermore, the color purity of the infrared blocking material was 14.5.

COMPARATIVE EXAMPLE 1

Indium nitrate ($In(NO_3)_3$) and tin chloride ($SnCl_2$) were mixed with each other in a mixing ratio of 90:10, and then dissolved in water.

After the completion of the dissolution of indium nitrate and tin chloride in water, sodium acetylacetonate, acting as a growth inhibitor, and a caustic soda aqueous solution, acting as a basic solution, were added in a predetermined equivalence ratio into a mixed solution to form powder co-precipitate.

The indium-tin co-precipitate, containing moisture, was rinsed with distilled water, dried, and sintered at 400 to 1000° C. under an oxygen-free hydrogen atmosphere to produce blue reduced ITO powder (D). In this respect, it is preferable that a sintering temperature be 400 to 800° C. When the sintering temperature is higher than 1000° C., the growth of particles, constituting the ITO powder, is significantly increased, preventing the uniform dispersion of the particles in paste, produced using the ITO powder and coated on a base, to reduce the transparency of paste.

COMPARATIVE EXAMPLE 2

Coating paste was produced using 40 parts by weight of reduced ITO ultrafine powder, containing indium and tin mixed with each other in a mixing ratio of 90:10, of comparative example 1 according to the same procedure as example 2.

The coating paste was coated on a polyethylene terephthalate (PET) film using a bar coater, and dried at 100° C. to form a coated layer with a thickness of 3 μm, containing the ITO powder.

The transmissivity of visible rays through the coated layer was 80% or more, and the transmissivity of infrared rays through the coated layer was 60% or more at a wavelength of 1000 nm.

In a graph showing xy chromaticity of the coated layer, an x value was 0.3229 and a y value was 0.3416. Furthermore, the color purity of the coated layer was a poor 3.2, and the acknowledgement quality of the coated layer was very poor.

COMPARATIVE EXAMPLE 3

Indium nitrate ($In(NO_3)_3$) and tin chloride ($SnCl_2$) were mixed with each other in a mixing ratio of 95:5 (E), and then dissolved in water. After the completion of the dissolution of indium nitrate and tin chloride in water, polyacrylic acid, acting as a growth inhibitor, and caustic soda aqueous solution, acting as a basic solution, were added in a predetermined equivalence ratio into the mixed solution to form powder co-precipitate.

The indium-tin co-precipitate, containing moisture, was rinsed with distilled water to completely remove the basic solution from the indium-tin co-precipitate, dried, and sintered at 400 to 1000° C. under an oxygen-free hydrogen atmosphere to produce blue reduced ITO powder. In this respect, it is preferable that a sintering temperature be 400 to 800° C. When the sintering temperature is higher than 1000° C., the growth of particles, constituting the ITO powder, is significantly increased, preventing the uniform dispersion of the particles in paste, produced using the ITO powder and coated on a base, to reduce the the transparency of paste.

COMPARATIVE EXAMPLE 4

A coating paste was produced using 40 parts by weight of reduced ITO ultrafine powder, containing indium and tin mixed with each other in a mixing ration of 95:5, of comparative example 3 according to the same procedure as example 2. The coating paste was coated on a polyethylene terephthalate (PET) film using a bar coater, and dried at 100° C. to form a coated layer with a thickness of 3 μm, containing the ITO powder. At this time, the transmissivity of visible rays through the coated layer was 75% or more, and the transmissivity of infrared rays through the coated layer was 65% or more at a wavelength of 1000 nm.

In a graph showing xy chromaticity of the coated layer, an x value was 0.3223 and a y value was 0.3427. Furthermore, the color purity of the coated layer was a poor 3.4, and the acknowledgement quality of the coated layer was very poor.

COMPARATIVE EXAMPLE 5

Indium nitrate ($In(NO_3)_3$) and tin chloride ($SnCl_2$) were mixed with each other in a mixing ratio of 90:10, and then dissolved in water. After the completion of the dissolution of indium nitrate and tin chloride in water, sodium acetylacetonate, acting as a growth inhibitor, and caustic soda aqueous solution, acting as a basic solution, were added in a predetermined equivalence ratio into a mixed solution to form a powder co-precipitate.

The indium-tin co-precipitate, containing moisture, was rinsed with distilled water to completely remove the basic solution from the indium-tin co-precipitate, dried, and sintered at 400 to 1000° C. under an oxygen atmosphere to produce yellow oxidized ITO powder (F). In this respect, it is preferable that a sintering temperature be 400 to 800° C. When the sintering temperature is higher than 1000° C., the growth of particles, constituting the ITO powder, is significantly increased, preventing the uniform dispersion of the particles in paste, produced using the ITO powder and coated on a base, to reduce the transparency of paste.

COMPARATIVE EXAMPLE 6

Coating paste was produced using 40 parts by weight of oxidized ITO ultrafine powder (F), containing indium and tin mixed with each other in a mixing ration of 90:10, of comparative example 5 according to the same procedure as example 2.

The coating paste was coated on a polyethylene terephthalate (PET) film using a bar coater, and dried at 100° C. to form a coated layer with a thickness of 3 μm, containing the ITO powder. At this time, the transmissivity of visible rays through the coated layer was 75% or more, and the transmissivity of infrared rays through the coated layer was 70% or more at a wavelength of 1000 nm.

In a graph showing xy chromaticity of the coated layer, an x value was 0.3223 and a y value was 0.3422. Furthermore, the color purity of the coated layer was a poor 3.1, and the acknowledgement quality of the coated layer was very poor.

COMPARATIVE EXAMPLE 7

Antimony chloride ($SbCl_3$) and tin chloride ($SnCl_2$) were mixed with each other in a mixing ratio of 20:80, and then dissolved in water. After the completion of the dissolution of antimony chloride and tin chloride in water, polyacrylic acid, acting as a growth inhibitor, and a caustic soda aqueous solution, acting as a basic solution, were added in a predetermined equivalence ratio into the mixed solution to form powder co-precipitate.

The antimony-tin co-precipitate, containing moisture, was rinsed with distilled water to completely remove the basic solution from the antimony-tin co-precipitate, dried, and sintered at 400 to 1000° C. under an oxygen-free hydrogen atmosphere to produce dark blue reduced ATO ultrafine powder (G). In this respect, it is preferable that a sintering temperature be 400 to 800° C. When the sintering temperature is higher than 1000° C., the growth of particles, constituting the ATO powder, is significantly increased, preventing the uniform dispersion of the particles in a paste, produced using the ATO powder and coated on a base, to reduce the transparency of paste.

COMPARATIVE EXAMPLE 8

Coating paste was produced using 40 parts by weight of ATO ultrafine powder (G), containing antimony and tin mixed with each other in a mixing ratio of 20:80, of comparative example 7 according to the same procedure as example 4. The coating paste was coated on a polyethylene terephthalate (PET) film using a bar coater, and dried at 100° C. to form a coated layer with a thickness of 3 μm, containing the ATO powder.

At this time, the transmissivity of visible rays through the coated layer was 75% or more, and the transmissivity of infrared rays through the coated layer was 65% or more at a wavelength of 1000 nm. In a graph showing xy chromaticity of the coated layer, an x value was 0.2833 and a y value was 0.3088. Furthermore, the color purity of the coated layer was 7.8.

COMPARATIVE EXAMPLE 9

Coating paste was produced using a mixture, containing the reduced ITO ultrafine powder of comparative example 1 and the ATO ultrafine powder of comparative example 7 mixed with each other in a mixing ration of 7:3, according to the same procedure as example 2.

The coating paste was coated on a polyethylene terephthalate (PET) film using a bar coater, and dried at 100° C. to form a coated layer with a thickness of 3 μm, containing the ITO and ATO powders. At this time, the transmissivity of visible rays through the coated layer was 75% or more, and the transmissivity of infrared rays through the coated layer was 60% or more at a wavelength of 1000 nm.

In a graph showing xy chromaticity of the coated layer, an x value was 0.3201 and a y value was 0.3371. Furthermore, the color purity of the coated layer was a poor 4.8, and the acknowledgement quality of the coated layer was very poor.

COMPARATIVE EXAMPLE 10

Coating paste was produced using a mixture, containing the reduced ITO ultrafine powder of comparative example 1 and the ATO ultrafine powder of comparative example 7 mixed with each other in a mixing ration of 5:5, according to the same procedure as example 2.

The coating paste was coated on a polyethylene terephthalate (PET) film using a bar coater, and dried at 100° C. to form a coated layer with a thickness of 3 μm, containing the ITO and ATO powders. At this time, the transmissivity of visible rays through the coated layer was 75% or more, and the transmissivity of infrared rays through the coated layer was 65% or more at a wavelength of 1000 nm.

In a graph showing xy chromaticity of the coated layer, an x value was 0.3031 and a y value was 0.3241. Furthermore, the color purity of the coated layer was a poor 5.7, and the acknowledgement quality of the coated layer was poor.

TABLE 1

|  | No. | ¹Type | ²P. | ³T. | ⁴I. | XY chromaticity X | Y | ⁵Pr. |
|---|---|---|---|---|---|---|---|---|
| Ex. | 2 | IATO powder of the present invention (A) | 75 | 75 | 82 | 0.3043 | 0.3281 | 18.2 |
|  | 4 | IATO powder of the present invention (B) | 70 | 78 | 58 | 0.3109 | 0.3319 | 16.1 |
|  | 6 | IATO powder of the present invention (C) | 78 | 82 | 37 | 0.3041 | 0.3278 | 14.5 |
| Co. Ex. | 2 | Reduced ITO powder (D) | 65 | 81 | 38 | 0.3229 | 0.3416 | 3.2 |
|  | 4 | Reduced ITO powder (E) | 73 | 75 | 35 | 0.3223 | 0.3427 | 3.4 |
|  | 6 | Oxidized ITO powder (F) | 77 | 73 | 32 | 0.3223 | 0.3422 | 3.1 |
|  | 8 | Reduced ATO powder (G) | 65 | 78 | 34 | 0.2833 | 0.3088 | 7.8 |
|  | 9 | Mixed type (7:3) ITO:ATO | 75 | 75 | 37 | 0.3201 | 0.3371 | 4.8 |
|  | 10 | Mixed type (5:5) ITO:ATO | 65 | 79 | 33 | 0.3031 | 0.3241 | 5.7 |

¹Type.: type of powder
²P.: particle size (nm)
³T.: the transmissivity of visible rays through the coated layer (%)
⁴I.: blocking index of infrared rays (%) (at the wavelength of 1000 nm)
⁵Pr.: the color purity of the coated layer

INDUSTRIAL APPLICABILITY

As described above, the present invention provides infrared blocking material, which has various infrared blocking functions, and excellent color texture and transparency by properly controlling a mixing ratio of indium, antimony, and tin. At this time, the infrared blocking material can be mass-produced at relatively low cost.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. Infrared blocking powder, which is produced by forming a mixture of an indium salt, an antimony salt, and a tin salt in a mixing ratio of 15 to 90 wt %:1 to 20 wt %:5 to 80 wt %, dissolving the mixture in water, adding a growth inhibitor and a basic solution into the water having the dissolved mixture to precipitate powder, rinsing the powder, drying the rinsed powder, and sintering the dried powder.

2. The infrared blocking powder as set forth in claim 1, wherein the indium salt, the antimony salt and the tin salt are indium nitrate ($In(NO_3)_3$), antimony chloride ($SbCl_3$) and tin chloride ($SnCl_2$), respectively.

3. The infrared blocking powder as set forth in claim 1, wherein the sintering of the dried powder is conducted at 400 to 1000 C under an oxygen-free hydrogen atmosphere.

4. Infrared blocking solution, comprising:
the infrared blocking powder according to claim 1, dispersed in a solvent, the solvent being selected from the group consisting of alcohol, water, an organic solvent, and a mixture thereof.

5. The infrared blocking solution as set forth in claim 4, wherein the infrared blocking powder has a particle size of 5 to 200 nm.

6. Infrared blocking solution, comprising:
the infrared blocking powder according to claim 1;
solvent;
conductive polymer;
organic dispersion agent; and
photoinitiator.

7. The infrared blocking solution as set forth in claim 6, wherein the infrared blocking powder has a particle size of 5 to 200 nm.

8. The infrared blocking solution as set forth in claim 6, wherein a content of the infrared blocking powder is 5 to 70 wt % in the infrared blocking solution.

9. Infrared blocking material, which is produced by coating the infrared blocking solution according to claim 6 on a surface of a base.

10. The infrared blocking material as set forth in claim 9, wherein an adhesive layer is formed on any one side of the infrared blocking material coated on the base.

11. Infrared blocking solution, comprising:
the infrared blocking powder according claim 2, dispersed in a solvent, the solvent being selected from the group consisting of alcohol, water, an organic solvent, and a mixture thereof.

12. Infrared blocking solution, comprising:
the infrared blocking powder according claim 3, dispersed in a solvent, the solvent being selected from the group consisting of alcohol, water, an organic solvent, and a mixture thereof.

13. Infrared blocking solution, comprising:
the infrared blocking powder according claim 2;
solvent;
conductive polymer;
organic dispersion agent; and
photoinitiator.

14. Infrared blocking solution, comprising:
the infrared blocking powder according claim 3;
solvent
conductive polymer;
organic dispersion agent; and
photoinitiator.

* * * * *